US006992734B1

(12) United States Patent  
Morishita et al.

(10) Patent No.: US 6,992,734 B1  
(45) Date of Patent: Jan. 31, 2006

(54) LIQUID CRYSTAL DISPLAY DEVICE

(75) Inventors: Shunsuke Morishita, Mobara (JP); Shuusuke Endou, Mobara (JP)

(73) Assignee: Hitachi, Ltd., Tokyo (JP)

( * ) Notice: Subject to any disclaimer, the term of this patent is extended or adjusted under 35 U.S.C. 154(b) by 108 days.

(21) Appl. No.: 09/671,429

(22) Filed: Sep. 27, 2000

(30) Foreign Application Priority Data

Sep. 30, 1999 (JP) ................................. 11-278844

(51) Int. Cl.  
*G02F 1/1333* (2006.01)

(52) U.S. Cl. ..................................................... 349/58

(58) Field of Classification Search ................. 349/58; 361/581; 362/581  
See application file for complete search history.

(56) References Cited

U.S. PATENT DOCUMENTS

| 5,293,262 | A | * | 3/1994 | Adachi et al. | ............... 349/149 |
| 5,450,221 | A | * | 9/1995 | Owen et al. | ................. 349/58 |
| 5,838,400 | A | | 11/1998 | Ueda et al. | |
| 6,473,146 | B1 | * | 10/2002 | Lee | ............................ 349/152 |

FOREIGN PATENT DOCUMENTS

JP 7-218914 1/1994

* cited by examiner

*Primary Examiner*—James A. Dudek  
(74) *Attorney, Agent, or Firm*—Reed Smith LLP; Stanley P. Fisher, Esq.; Juan Carlos A. Marquez, Esq.

(57) ABSTRACT

The object of the present invention is to make parts and kinds of liquid crystal display devices in common for cope stably and flexibly with commercial products of computer makers and television makers which have been promoted in various kinds, for simplifying maintenance of a liquid crystal display unit mounted on computers, display monitors therefor or televisions, and preferably for enabling to omit positional adjustment of a light source unit and a liquid crystal display panel during the maintenance of the liquid crystal display device. For this object, the invention provides a liquid crystal display device comprising first, second and third housings, a liquid crystal display panel fixed between the first and second housings, a light source (cold-cathode fluorescent tubes) fixed to the third housing, the second and third housings being detachable to one another, being constructed by overlapping the first, second and third housings with each other, wherein a timing-converter board fixed to an opposite side surface of the third housing to a side surface to which the light source is fixed, and protrusions formed on the opposite side surface so as to determine a maximum thickness of the liquid crystal display device.

6 Claims, 8 Drawing Sheets

LIQUID CRYSTAL DISPLAY DEVICE

BACKGROUND OF THE INVENTION

1. Field of the Invention

The invention relates to a liquid crystal display device used for a monitor for laptop personal computers, desktop computers or the like, and a liquid crystal display monitor using the same.

2. Description of the Related Art

Liquid crystal display devices have become widespread as monitors for laptop personal computers and desktop computers.

In such products, a liquid crystal display device is mounted as a liquid crystal display module including in combination a liquid crystal display panel and a light source. A configuration of such liquid crystal display device is described in, for example, Japanese Patent Laid-Open No. 264991/1993 and Japanese Patent Laid-Open No. 218914/1995.

SUMMARY OF THE INVENTION

In recent years, commercial products have been diversified in such products as laptop personal computers and desktop computers.

More specifically, under circumstances, in which these commercial products are produced in various kinds and small quantity, liquid crystal display devices cannot but be diversified in configuration.

Meanwhile, reduction of kinds of parts for liquid crystal display devices has become a task in order to supply liquid crystal display devices stably (first task).

Also, under circumstances, in which time taken in using monitors of laptop personal computers, desktop computers has been increasing, it has been demanded to reduce burdens related to maintenance of these commercial products (second task). More specifically, an increase in time taken in using the above-mentioned computer products in use in offices and personal use has increased burdens on light source units, in particular, cold-cathode fluorescent tubes used therefor, of liquid crystal display devices to cause unexpected deterioration of these parts.

Further, under circumstances, in which computer manufactures have increased, it has become important to efficiently supply the above mentioned liquid crystal display devices to these manufactures. Under such circumstances, it is essential to reduce probability of breakage of liquid crystal display devices as much as possible during conveyance of the devices to computer manufactures.

However, under circumstances, in which it is promoted to make liquid crystal display devices thin and to make control devices therefor high in performance, it has become difficult year after year to reduce the above-mentioned breakage. Also, under circumstances, in which production of liquid crystal display devices tends to be done in various kinds and small quantity, there has been increased the possibility that supplying of liquid crystal display devices of particular types cannot but be stopped due to problems of the above-mentioned breakage and so on.

It is a first object of the invention to use types of parts for liquid crystal display devices in common to stably and flexibly cope with commercial products of manufactures of computers and televisions, which get various in kind.

It is a second object of the invention to simplify maintenance of liquid crystal display devices mounted in computers, display monitors therefor, and televisions, and to omit positional adjustment of a light source unit and a liquid crystal display panel at the time of maintenance or to prevent particles such as dusts from entering a gap between a liquid crystal display panel and an optical sheet adjacent thereto.

To solve the above-mentioned problems in a liquid crystal display device comprising first, second and third housings, the second and third housings of which are detachable from one another; a liquid crystal display panel fixed between the first and second housings; and a light source fixed to the third housing, being assembled by overlapping the first, second and third housings with one another, the present invention fixes a timing-converter board fixed to a surface of the third housing opposite to another surface thereof the light source is fixed to, and provides protrusions being formed on the opposite surface of determining a maximum thickness of the liquid crystal display device. These protrusions protect parts of the timing-converter board against breakage due to external forces applied to the liquid crystal display device.

Also, the protrusions are formed inside a peripheral edge of the liquid crystal display device.

Also, a light source control circuit is arranged on the opposite side surface.

Also, a first fixing means for fixing the first and second housings, and a second fixing means for fixing the second and third housings are provided, and the first fixing means does not fix the third housing.

Further, a liquid crystal display monitor uses the liquid crystal display device, and the first fixing means is used to fix either of a housing of the liquid crystal display device, and the first or second housings.

The above-mentioned first, second and third housings contain first members (principal plane member, plate) along a principal plane of, for example, a substrate (for example, a member called a liquid crystal display substrate, or a transparent substrate corresponds thereto) contained in the above-mentioned liquid crystal display panel. In the case where a peripheral edge of an image display area of a liquid crystal display device is made small, the first members of the first and second housings are occupied at their surfaces by openings, through which a liquid crystal display panel is exposed, to assume a configuration of a so-called picture frame. Profiles of these first members are changed in area in the order of, for example, the first, second and third housings, and the liquid crystal display device is assembled in such a manner that the profile of the first member of one of the housings receive therein the profile of the first member of the other of the housings in overlapping manner. Also, at least one of the first, second and third housings comprises a second member (side surface member, side) projecting from one of surfaces of or a peripheral edge of the first member in a thickness direction of the substrate. In accordance with use of the liquid crystal display device, the second member is in some cases formed integrally in such a manner to surround at least a part of the one of surfaces of the first member and interrupting portions such as notches are in some cases provided on at least the part. The second member also serves as a guide when two of the first to third housings are overlapped on one another.

"A thickness (maximum thickness)" of the liquid crystal display device in the invention is defined as a dimension in a thickness direction of the substrate (direction, in which the second member protrudes). A height of the protrusions is defined as a dimension in a thickness direction of the substrate. The definition of this configuration will be explained later with reference to the drawings. In addition, the plurality of protrusions may be provided on the third member to be spaced from one another, or walls formed as the protrusions may be formed on the third member to surround a portion (for example, a portion, on which the above-mentioned parts are mounted) of the first member of the third housing.

The invention makes parts of and types of liquid crystal display devices common to enable stably and flexibly coping with commercial products of computer makers and television makers, which have been increased in kinds. Also, it is possible to simplify maintenance of liquid crystal display devices mounted on computers, display monitors therefor, and televisions, and to omit positional adjustment of a light source unit and a liquid crystal display panel at the time of maintenance. Alternatively, in the case where an optical sheet is provided on the second housing to be adjacent a liquid crystal display panel, the liquid crystal display device can be prevented from being deteriorated in optical characteristics due to entering of dust between the liquid crystal display panel and the optical sheet, because there is no need to separate the first housing and the second housing.

These and other objects, features and advantages of the present invention will become more apparent from the following description when taken in conjunction with the accompanying drawings.

BRIEF DESCRIPTION OF THE DRAWINGS

FIGS. 7A and 7B are illustrations of a first constitution according to the invention.

FIGS. 9A and 9B are illustrations of a second constitution according to the invention.

FIGS. 10A–10C shows an example of a monitor making use of the liquid crystal display device according to the invention.

DETAILED DESCRIPTION

An explanation will be given below to an embodiment of the invention with reference to the drawings. In addition, parts having the same function are designated by the same characters in the drawings illustrated below, and reiteration of the explanation is omitted.

<Entire Constitution of an Liquid Crystal Display Device>

Figure 1:
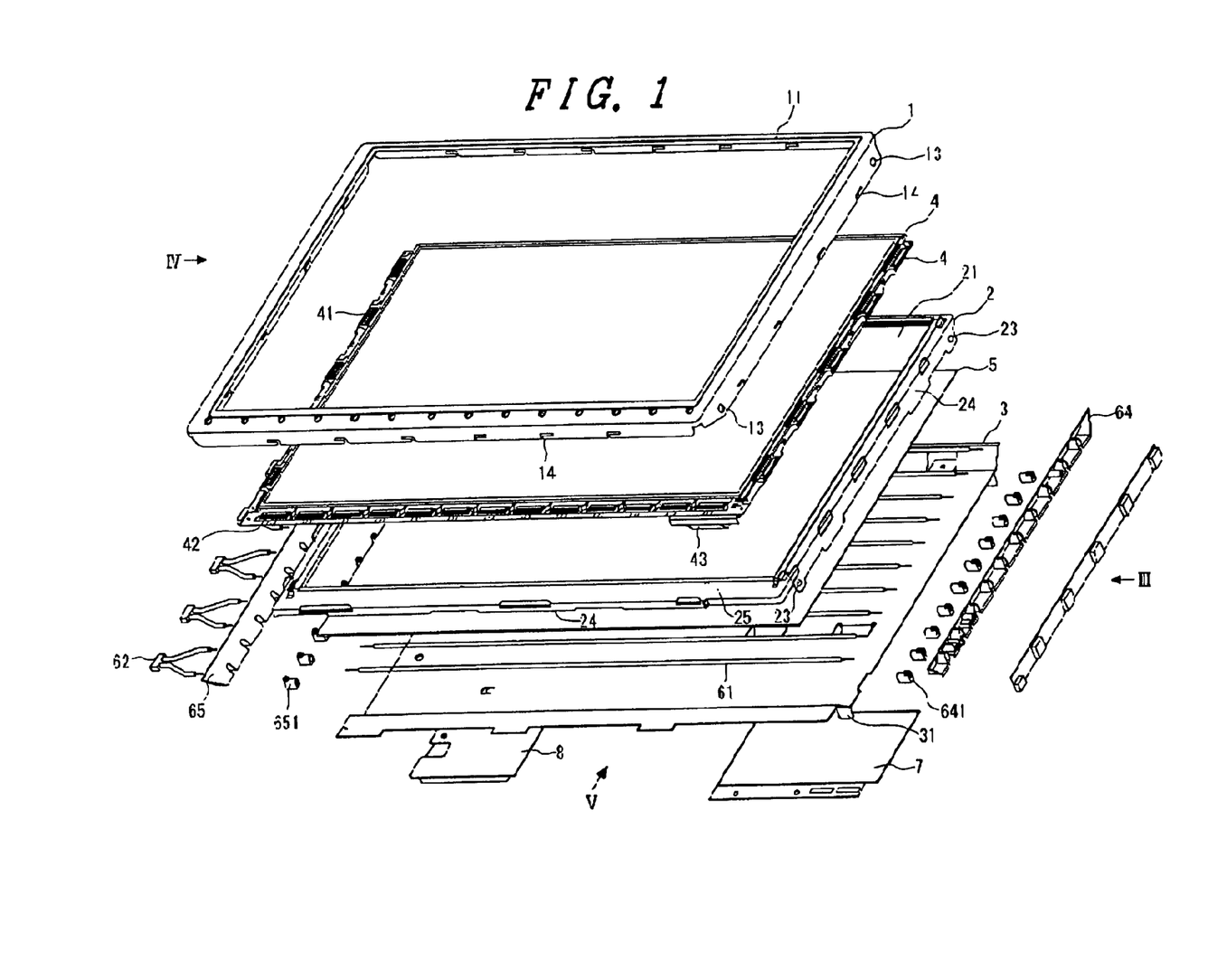
FIG. 1 is an exploded, perspective view showing a liquid crystal display device according to the invention (a view as seen from a side of a liquid crystal display panel)
Figure 2:
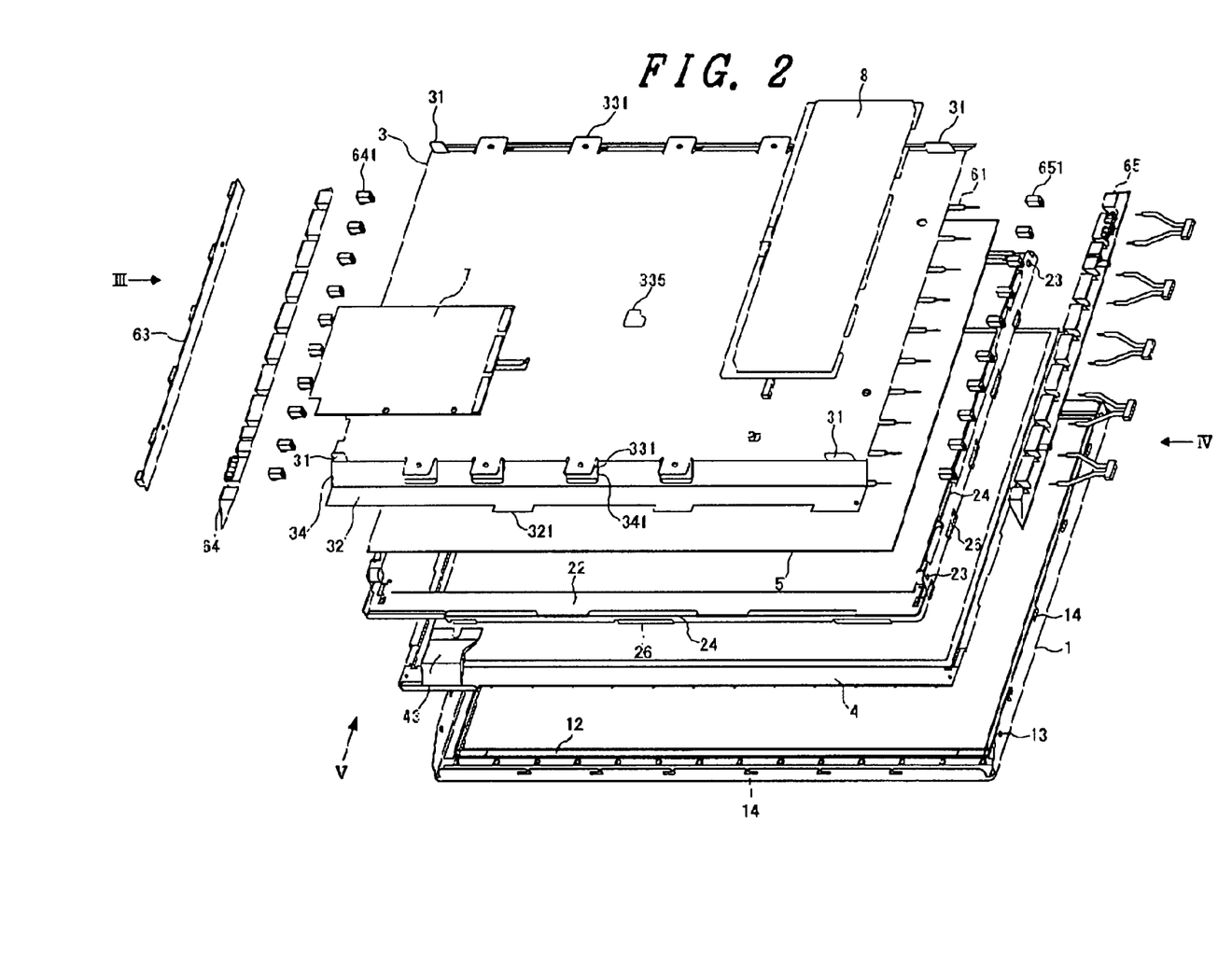
FIG. 2 is an exploded, perspective view showing the liquid crystal display device according to the invention (a view as seen from a back side of the liquid crystal display device, that is, a view as seen from a side opposite to the side of FIG. 1)

FIGS. 1 and 2 are exploded, perspective views showing a liquid crystal display device according to the invention.

FIG. 1 is a perspective view from a side of a liquid crystal display panel (a front side of the liquid crystal display device relative to a user's visual field), and FIG. 2 is a perspective view from a side opposite to FIG. 1 (a back side of the liquid crystal display device relative to a user's visual field).

In FIG. 1, the reference numeral 1 designates a first housing, 2 second housing 2, 3 a third housing, 4 a liquid crystal display panel, 5 an optical sheet (a diffusion film on an optical source side, and a prism film on a display panel side), 61 cold-cathode fluorescent tubes, 7 a timing-converter board, 8 a light source control circuit board constituting a light source control circuit, 11 an opening (liquid crystal display window) of the first housing 1, 21 an opening of the second housing, 13 a hole in the first housing 1, 23 holes in the second housing 2, 14 notches (notches bent and fixed) on the first housing 1, 24 projections on the second housing 2, 22 a terrace on the second housing 2, 64, 65 frames, 641, 651 rubber bushes, 43 a flexible printed circuit board, 62 connectors (high voltage side), 63 connectors (low voltage side), 41 a gate drive IC, and 42 a drain drive IC.

In FIG. 2, the reference numeral 31 designates a protrusions provided on the third housing 3 for protection of parts on the timing-converter board 7, 32 a surface of the terrace, 321, 331 aprons, 33 an upper surface, 34 side surfaces, 341 openings for provision of aprons 331, and 335 an opening for monitoring of brightness of a light source.

The liquid crystal display device is assembled by fixing the liquid crystal display panel 4 between the first housing 1 and the second housing 2, and fixing to the second housing 2 and the third housing 3, to which a light source containing the cold-cathode fluorescent tubes 61 (or discharge tubes) is fixed. The second housing 2 and the third housing 3 are detachable. The first housing 1, the second housing 2 and the third housing 3 are superposed on one another to constitute the liquid crystal display device.

Figure 3A:
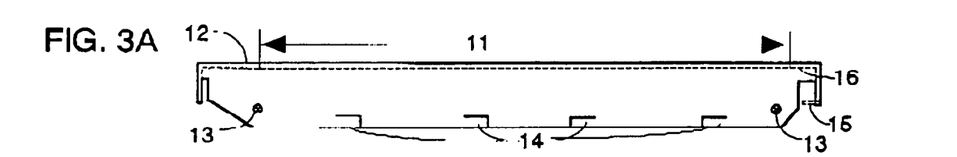
FIGS. 3A–3I include assembly drawings FIGS. 3A to 3G, a perspective view FIG. 3H, and a sketch drawing FIG. 3I of the liquid crystal display device according to the invention, as viewed from a right side surface (III direction) of FIG. 1.
Figure 3B:
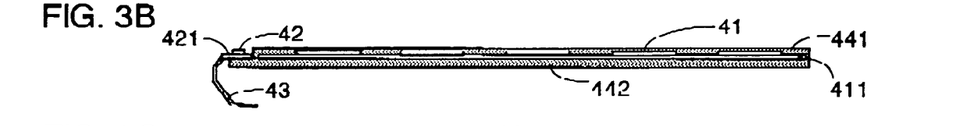
Figure 3C:
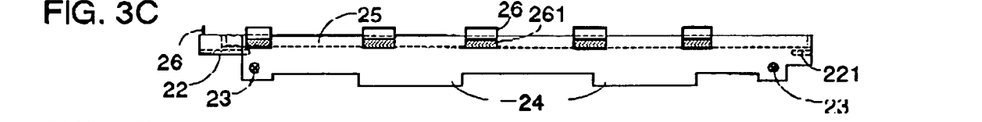
Figure 3D:
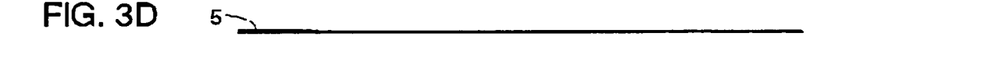
Figure 3E:
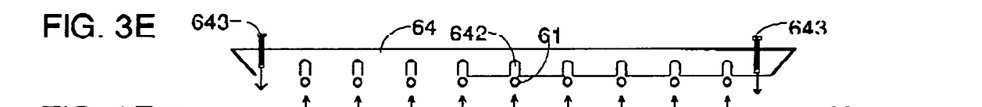
Figure 3F:
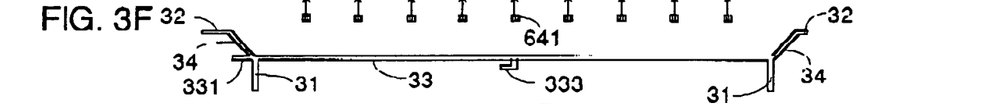
Figure 3G:
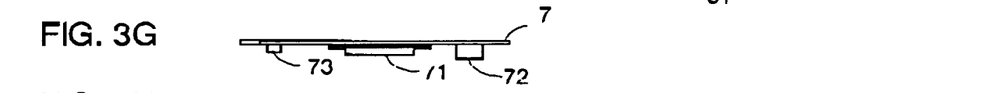
Figure 3H:
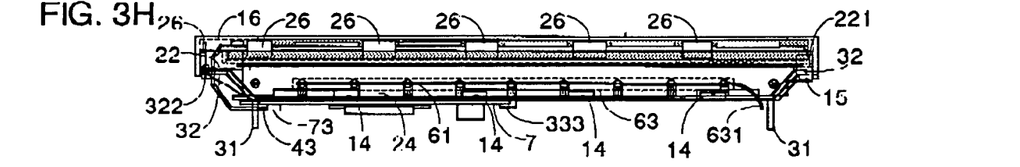
Figure 3I:
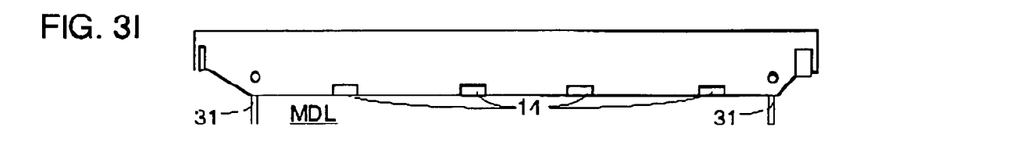
Figure 4:
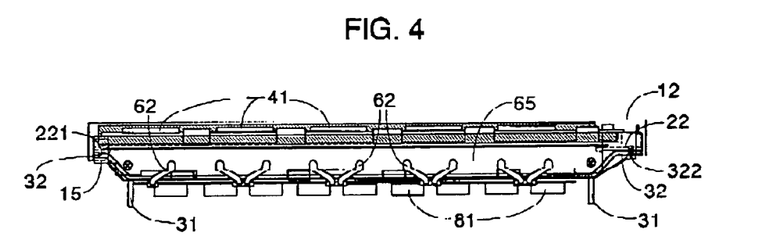
FIG. 4 is a perspective view showing the liquid crystal display device according to the invention, as viewed from a left side surface (IV direction) of FIG. 1.
Figure 5A:
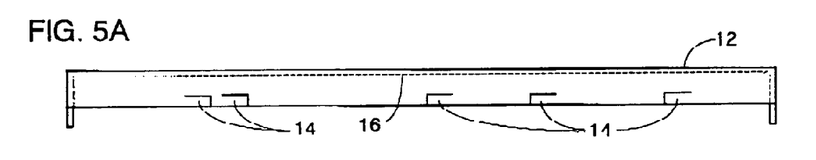
FIGS. 5A–5D include assembly drawings FIGS. 5A to 5C, a perspective view FIG. 5D of the liquid crystal display according to the invention, as viewed from a front side (V direction) of FIG. 1.

FIGS. 3A 3I include detailed assembly drawings of the above-mentioned liquid crystal display device as viewed from a III direction of FIG. 1 and views after assembly, FIG. 4 is a detailed, perspective view showing the liquid crystal display device after assembly as viewed from a IV direction of FIG. 1, and FIG. 5A–5D include conceptional assembly drawings and a view, after assembly, of the liquid crystal display device as viewed from a V direction of FIG. 1. Also, FIG. 6 is an overhead view of FIG. 2 (a back view of the liquid crystal display relative to a user's visual field) after assembly. In addition, it is to be understood that relative to FIGS. 1 and 2, constitutions in FIGS. 3 to 6 are partly deformed for the purpose of explanation. For example, ten cold-cathode fluorescent tubes 61 in FIGS. 1 and 2 are shown as nine in FIGS. 3 to 6.

In FIG. 3A, the reference numeral 12 designates an upper surface of the first housing 1, 15 designates a terrace on the first housing 1, and 16 designates an underside of the first housing 1.

In FIG. 3B, the reference numerals 411, 421 designate printed circuit boards, and 441, 442 designate LCD substrates.

In FIG. 3C, the reference numeral 25 designates an upper surface (support of the LCD substrates) of the second housing 2, 26 designates protrusions, 261 designates openings for receiving the protrusions, and 221 designates a terrace.

In FIG. 3E, the reference numeral 642 designates grooves provided on a frame 64 for holding the cold-cathode fluorescent tubes 61, and 643 designates screws.

In FIG. 3F, the reference numeral 333 designates a hanger.

In FIG. 3G, the reference numeral 71 designates a timing-converter LSI, 72 designates a voltage transformation element (ferrite core), and 73 designates a connector (port).

In FIG. 3H, the reference numeral 631 designates a length of cable (low voltage side).

In FIG. 3I, MDL designates a liquid crystal display module.

In FIG. 4, the reference numeral 81 designates a voltage transformation element (ferrite core).

In FIGS. 5A–5D, the reference numeral 74 designates screws for fixing the timing-converter board 7 to an outside surface of the third housing 3, 82 designates screws for fixing the light source control circuit board 8 to an outside surface of the third housing 3, and 334 designates screws.

<Liquid Crystal Display Panel 4>

The liquid crystal display panel 4 comprises, as shown in FIG. 3B, the pair of substrates 441, 442, a body containing liquid crystal compounds sealed between the substrates, and the drive ICs (integrated circuit elements) 41, 42 for applying electric field to the liquid crystal compounds to change optical transmissivity in a direction through the substrates. These drive ICs are arranged on the printed circuit boards 411, 421, which in turn are mounted on a peripheral edge of one 442 of the pair of substrates. The liquid crystal compounds sealed between the pair of substrates 441, 442 constitute a so-called liquid crystal layer between the substrates, and as the layer is negligibly thin in thickness as compared with the both substrates, it is not shown.

Figure 11:
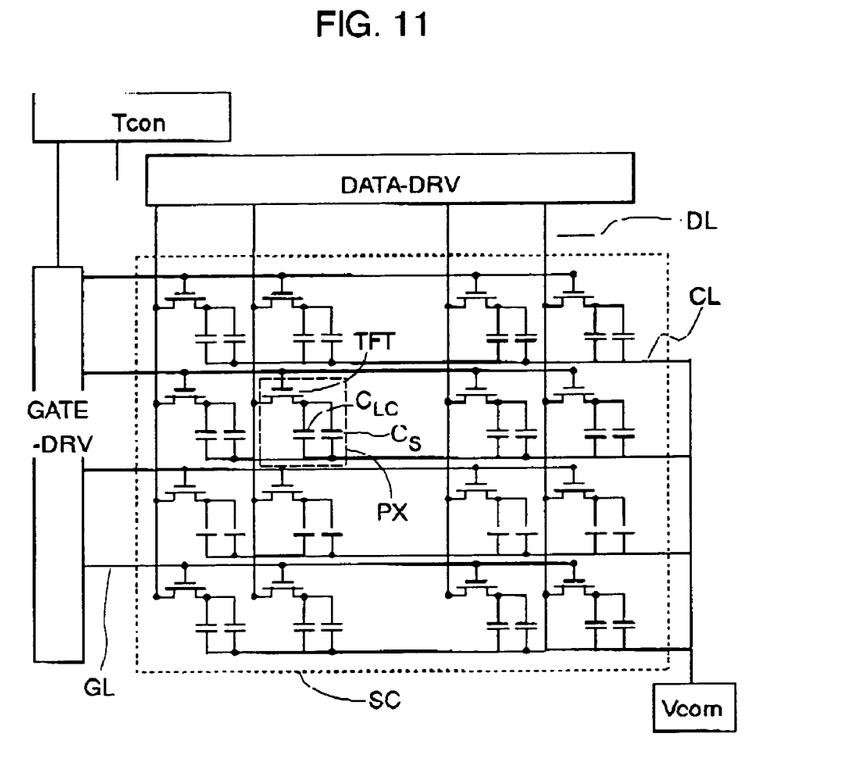
FIG. 11 is a circuit diagram containing a matrix portion and its surroundings of the liquid crystal display device.

FIG. 11 is a schematic view showing the liquid crystal display device, that is, a connection diagram containing an equivalent network for a display matrix portion and its surrounding network.

Tcon designates a timing-converter circuit, SC designates an image display region, PX designates a pixel, $C_{LC}$ designates a capacitance of a liquid crystal layer (cell), $C_S$ designates an additional capacitance of an pixel, GATE DRV designates a gate signal drive circuit, GL designates gate signal lines (scanning signal lines), DATA-DRV designates a data signal drive circuit, DL designates data signal lines (picture signal lines). Vcom designates a common (counter) voltage power source, and CL designates a common (counter) voltage signal line.

The liquid crystal display panel 4 shown in the embodiment is a liquid crystal display device called an active matrix type, and is known as one having, for example, an equivalent network shown in FIG. 11. As shown in FIG. 11, the liquid crystal display device of this type have switching elements TFT on respective pixels PX (one of which is shown in an area enclosed by broken lines) arranged two-dimensionally in an image display area (a so-called screen) SC, and at least a pair of electrodes (forming of capacitance $C_{LC}$ with the liquid crystal layer therebetween) for application of electric field to the liquid crystal layer. In the liquid crystal display device according to the embodiment, the above-mentioned switching elements TFT are represented by symbols for field-effect transistors, and may be replaced by diodes or the like.

The gate signal lines GL are connected to gate electrodes of symbols for field-effect transistors, to which signals from the gate signal drive circuit GATE-DRV are supplied. The gate signal lines GL are arranged in plural in parallel on, for example, the substrate 442, and connected to gate electrodes of the switching elements TFT for the respective pixels PX arranged along the respective gate signal lines GL.

Meanwhile, each of electric paths opened and closed by the switching elements TFT is connected at one end thereof to one of a pair of electrodes (called pixel electrodes), which form capacitance $C_{LC}$ with the above-mentioned liquid crystal layer therebetween, and connected at the other end thereof to the data signal lines DL. The data signal lines DL are arranged in plural in parallel on, for example, the substrate 442, and connected to the above mentioned other ends of the switching elements TFT for the respective pixels PX arranged along the respective data signal lines DL. The above-mentioned other ends of the switching elements TFT are supplied with signals from the data signal drive circuit DATA-DRV. The above-mentioned one, ends of the switching elements TFT may be conveniently called source electrodes, and the other ends called drain electrodes, irrespective of functions thereof. Therefore, the data signal drive circuit DATA-DRV is called "drain signal drive circuit".

The data signal lines DL and the gate signal lines GL extend in directions, in which they intersect each other, and are electrically separated from each other above and below an insulating film (for example, a gate insulating film of, the above-mentioned field-effect transistors) on the substrate 442.

In the respective pixels PX shown in FIG. 11, the other (called counter electrode or common electrode) of the pair of electrodes, which form capacitance $C_{LC}$ with the liquid crystal layer therebetween, is applied with a predetermined voltage through the counter voltage signal line CL from the voltage power source Vcom. Also, the additional capacitance $C_S$ is formed in order to suppress fluctuation of potential difference between the electrodes, which form capacitance $C_{LC}$ with the liquid crystal layer therebetween, while the switching elements TFT are closed. The additional capacitance $C_S$ is constituted by, for example, having the above-mentioned pixel electrode and the counter electrode facing each other with a dielectric (the above-mentioned gate insulating film or the like) except the liquid crystal layer. With ones called a TN type (twisted nematic) among liquid crystal display devices, the pixel electrode and the counter electrode are frequently arranged to face each other with the liquid crystal layer interposed therebetween, and with ones called a IPS type (enplane switching type) or a FFS type (fringe field type), the pixel electrode and the counter electrode are frequently arranged on the same substrate. With the TN type, pixel electrodes are provided separately every pixel PX on, for example, the substrate 442, while counter electrodes are in some case provided, which is large to face pixel electrodes of a plurality of pixels PX disposed in the image display area SC on the substrate 441.

With a liquid crystal display device of active matrix type, switching elements TFT of a plurality of pixels PX along the respective gate signal lines GL are selectively opened every gate signal line GL to supply data signals to the pixels disposed along the respective gate signal lines GL in a time-divisional manner. A circuit for controlling this is called the timing-converter circuit Tcon. Such timing-converter circuit Tcon generates clock signals for, e.g. the above-mentioned time-divisional control, and supplies a liquid crystal drive voltage applied to the liquid crystal layer, which corresponds to individual pixels PX. A circuit having a function similar to this is used in passive matrix type liquid crystal display devices (typified by STN (super twisted nematic)). Accordingly, the timing-converter circuit Tcon is estimated as a liquid crystal drive control and power source circuit.

The timing-converter circuit Tcon is formed on the timing-converter board 7 (printed board) shown in FIGS. 1 to 6 to be disposed on a back surface (an upper surface 33 shown in FIG. 2) of the third housing 3 as viewed from a user of the liquid crystal display device. As shown in FIGS. 3 and 6, the timing-converter board 7 mounts thereon the voltage transformation element 72 made of ferrite core or the like in addition to the timing-converter LSI 71. While other elements are formed on the timing-converter board 7, they are omitted from the drawings for the simplicity of explanation.

As described above, the timing-converter circuit Tcon not only generates signals for image display control, but also supplies data signal voltage applied to the liquid crystal layer. The liquid crystal display device is supplied with a power source voltage of, for example, 12 V (even when AC voltage of 100 V is supplied from an external power source, it is once converted into a predetermined power source voltage value). In contrast, the drive ICs connected to the gate signal lines GL and the data signal lines DL have voltage of 3 V to 5 V. On the other hand, voltage applied to the liquid crystal layer by the pixel electrodes in the individual pixels PX ranges, for example, from 5 V to 10 V depending upon the kind of liquid crystal compounds used. Further, to avoid polarization of the liquid crystal layer during control thereof. It is necessary to reverse polarity relative to electric potential of the counter electrodes. Accordingly, it is requested that supplying of voltage to the pixel electrodes realize voltage fluctuation in the range of two times voltage applied the liquid crystal layer, for example, 10 V to 20 V. Therefore, it is essential to mount the voltage transformation element 72 on the timing-converter board 7 in order to generate voltage signals, which are different in width of fluctuation by uses, from a predetermined voltage supplied to the timing-converter substrate. Such request is the same with a liquid crystal drive control and power source circuit in passive matrix type liquid crystal display devices.

In a liquid crystal display device of active matrix type, the gate signal drive circuit GATE DRV shown in FIG. 11 contains the plurality of gate drive ICs 41 (shown in FIGS. 1, 3 and 4. The data signal drive circuit DATA-DRV contains the plurality of data drive ICs 42 shown in FIGS. 1, 3 and 4. The timing-converter board 7 and these groups of drive ICs are connected to each other by the flexible printed circuit board 43. A circuit pattern generated on the flexible printed circuit board 43 is connected at one end thereof to a circuit pattern generated on one end of a printed circuit board 412 mounting the data drive ICs 42, and a terminal provided on the other end thereof is inserted into the connector (port) 73 provided on the timing-converter board 7 to connect the both circuit patterns to each other.

The timing converter board 7 supplies, through the flexible printed circuit board 43, clock signals, drive voltage of the gate drive ICs 41 and so on to the gate signal drive circuit GATE-DRV, and supplies clock signals, drive voltage of the data drive ICs 42, voltage applied to the liquid crystal layer and so on to the data signal drive circuit DATA-DRV. The gate drive ICs 41 constituting the gate signal drive circuit GATE-DRV are mounted on the printed circuit board 411, and receive voltages and signals from the timing-converter board 7 owing to connection of the both circuit patterns to each other by means of joiners (not shown) provided between the printed circuit board 411 and the printed circuit board 412. An arrangement similar to the above one is found in passive matrix type liquid crystal display devices, so, for example, the gate drive ICs 41 are replaced by common electrode drive ICs, and the data drive ICs 42 are replaced by segment drive ICs.

<Storage of the Liquid Crystal Display Panel 4>

The above-mentioned liquid crystal display panel 4 is contained between the first housing 1 and the second housing 2 shown in FIGS. 1 to 3.

The image display area SC not shown but diagrammatically shown in FIG. 11 is formed on an upper surface of the liquid crystal display panel 4 shown in FIG. 1. The first housing 1 has the opening 11 contacting with the upper surface, through which opening a user of the liquid crystal display device sees the image display area SC. A surface of the first housing 1 having therein the opening 11 is formed by a sheet material of, for example, metal or the like, which has the upper surface 12 facing a side of a user of the liquid crystal display device and the surface (underside) 16 opposite to the upper surface, as shown in FIG. 3A. The liquid crystal display panel 4 shown in FIG. 1 is fixed to the first housing 1 with a peripheral edge of its upper surface contacting with the underside 16.

The underside (upper surface in FIG. 2) of the liquid crystal display panel 4 shown in FIG. 1 is fixed such that its peripheral edge contacts with a recess 25 on the upper surface of the second housing 2 shown in FIG. 3C. Although not shown in FIG. 3C, the recess 25 on the upper surface is provided with an opening, which corresponds to the image display area SC in the liquid crystal display panel 4.

In this manner, the first housing 1 and the second housing 2 are fixed in a state, in which the peripheral portions on the upper surface of and on the underside of the liquid crystal display panel 4 are contacted with the first housing 1 and the second housing 2, respectively. Either of the first housing 1 and the second housing 2 is formed with a side surface, which extends in a direction, along which its peripheral edge intersects the upper surface or the underside of the liquid crystal display panel 4. As shown in FIGS. 1 and 3A, rectangular-shaped notches 14 are formed on lower portions of side surfaces of the first housing 1. Also, holes 13 are provided at two locations on III- and V-sides, respectively, of these side surfaces in FIG. 1. Meanwhile, as shown in FIGS. 1 and 3B, protrusions 24 are formed on lower portions of side surfaces of the second housing 2. Also, holes 23 are provided at two locations on III- and V-sides, respectively, of these side surfaces in FIG. 1.

The liquid crystal display panel 4 is received between the first housing 1 and the second housing 2 in a state, in which the second housing 2 is covered by side surfaces of the first housing 1 when the both housings are put together. The holes 13 in the first housing 1 and the holes 23 in the second housing 2 are formed so as to be substantially aligned in position when the liquid crystal display panel 4 is held between these housings. Threads are formed on inner walls of at least one of the holes 13 and the holes 23. First, screws are passed through the corresponding holes 23 from the four holes 13 (two on the III-side and two on the V-side in FIG. 1) on the side surfaces of the first housing 1 to loosely fix the first housing 1 and the second housing 2 to each other.

Figure 5B:
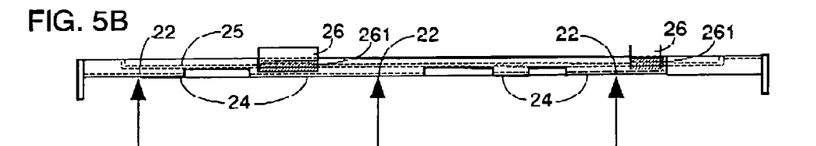
Figure 5C:
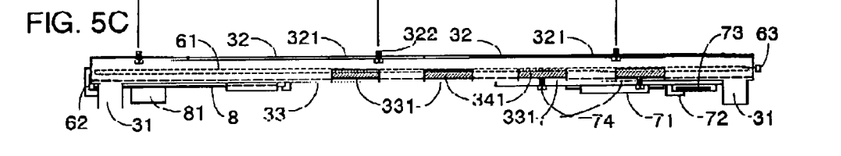
Figure 6:
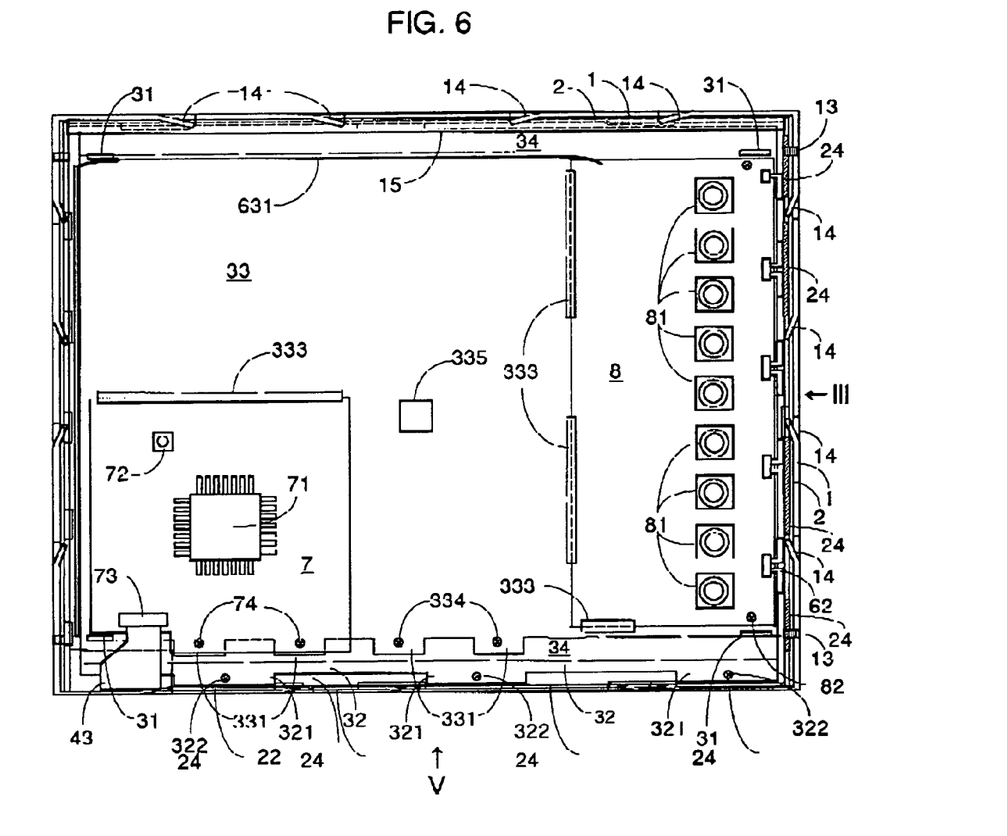
FIG. 6 is a sketch drawing of the liquid crystal display device according to the invention, as viewed from a top surface (or the back side of the liquid crystal display device) of FIG. 2.

At this time, the notches 14 on the side surfaces of the first housing 1 come near the protrusions 24 provided on the lower portions of the side surfaces of the second housing 2 (see FIGS. 1, 3C and 5B). The respective notches 14 are pushed and bent below the side surfaces of the second housing 2 (in other words, inside the first housing 1) in such a manner as to have rectangular, upper sides of the notches 14 (see FIGS. 1, 3A and 5A) abutting against the lower portions (on which the protrusions are not formed) of the protrusions 24 on the side surfaces of the second housing 2. Thereby, the first housing 1 and the second housing 2 are fixed to each other. FIG. 6 shows the first housing 1 as being positioned outermost as a profile 1 of its side surfaces and the second housing 2 as being positioned adjacent to the profile 1 of the first housing 1 as a profile 2 (a portion thereof partly covered by the terrace on the first housing 1 (described later) in an upper area of the drawing being indicated by broken line) of its side surfaces. As shown in FIG. 6, the notches 14 are bent whereby the first housing 1 assumes such a configuration that the notches hold undersides of the side surfaces of the second housing 2. In this manner, for example, Japanese Patent Laid-Open No. 199180/1995 discloses a configuration, in which notches 14 (or pawls) are formed on side surfaces of one of housings and are pushed into recesses formed on those side surfaces of the other of the housings, which contact with the side surfaces of the one of the housings, to fix the two housings. Of course, the notches 14 on the side surfaces of the first housing 1 may be replaced by holes and the side surfaces of the second housing 2 may be extended downward to permit threaded holes to be formed on the side surfaces to be conformed to the holes on the side surfaces of the first housing.

As shown in FIGS. 1, 3C and 5B, upwardly extending protrusions 26 are formed on upper portions of the side surfaces of the second housing 2. The protrusions 26 are provided by forming cuts partially on the sheet material on the side surfaces and bending the same upward. Accordingly, openings 261 appear on the upper portions of the side surfaces corresponding to the protrusions 26. The protrusions 26 serve as a guide when the second housing 2 is inserted into a space defined by the side surfaces of the first housing 1, and are formed so as to contact with the underside 16 of the first housing 1 (see FIGS. 3A and 5A) at the time when the liquid crystal display panel 4 is received between the housings. Therefore, even if forces tending to push the housings toward each other were applied, they would be buffered by the protrusions 26 and the underside 16 of the first housing 1 before being applied to the liquid crystal display panel 4, whereby in particular, the glass substrate of the liquid crystal display panel 4 is prevented from being broken.

As shown in FIGS. 3C and 5B, the second housing 2 is formed with terraces 22, 221, which extend inside from the side surfaces, as well as with the upper surface 25 having the recess holding the liquid crystal display panel 4. The terrace 22 hides below the upper surface 25 of the second housing 2 in FIG. 1 but can be seen in FIG. 2. Also, as shown in FIG. 5B, the terrace 22 is formed on that portion of the side along the data drive ICs 42, on which the protrusions 24 are formed. Formed between the terraces 22, 221 and an underside (back surface) of the upper surface 25 is a gap, into which an end of the optical sheet 5 shown in FIG. 3D is inserted to be fixed. The optical sheet 5 is fixed in the order of, for example, the prism sheet and the diffusion sheet from a side of the liquid crystal display panel 4. The diffusion sheet may be replaced by a diffusion plate, which is provided by applying dot printing to an acrylic plate, in which case the recess portion on the upper surface 25 is preferably formed by a separate member and an edge of the upper surface 25 surrounding the recess is fitted onto a peripheral edge of the member. With such arrangement, the diffusion plate is surely fixed to the second housing 2 upon securing of the first housing 1 and the second housing 2. The optical sheet may be replaced by a constitution composed of a first prism sheet, a first diffusion sheet, a second diffusion sheet, and a second prism sheet for the liquid crystal display panel 4 in accordance with use of the liquid crystal display device and specifications of an optical source unit described later.

<Assembly of the Optical Unit (securing manner thereof to the third housing 3)>

As shown in FIGS. 1, 2 and 3E, the third housing 3 is composed of the upper surface 33 projecting on a back side as viewed from a user of the liquid crystal display device, side surfaces 34 joined to two opposite sides at ends of the upper surface, and terraces 32 joined to ends of the respective side surfaces to extend on a plane along the upper surface 33. As shown in FIGS. 3A–3I, assuming that a side of a user of the liquid crystal display device is disposed on an upper portion of the drawing, the third housing 3 has a cross sectional shape "downwardly concave". Also, as apparent from FIGS. 1 and 5C, the downwardly concave, cross sectional shape appears along a direction, in which the gate drive ICs 41 are arranged, but does not appear along a direction, in which the gate drive ICs 42 are arranged.

In this embodiment, the downwardly concave shape of the third housing 3 is made use of to fix the plurality of cold-cathode fluorescent tubes 61, which constitute light source units of the liquid crystal display device. Supplied at one ends with a higher voltage than at the other ends, the cold-cathode fluorescent tubes 61 is lit. The one ends of the cold-cathode fluorescent tubes 61 are called high voltage sides (hot sides), and the other ends are called low voltage sides (cold sides). In FIG. 1, portions near the high voltage ends of the cold cathode fluorescent tubes 61 are fitted into grooves 652 provided on the frame 65, and rubber bushes 651 are inserted into the grooves 652 to be fixed to the frame 65. Likewise, portions near the low voltage ends of the cold-cathode fluorescent tubes 61 are fitted into grooves 642 provided on the frame 64, and rubber bushes 641 are inserted into the grooves to be fixed to the frame 64. The frames 64, 65 fixing thereto the both ends of the cold-cathode fluorescent tubes 61 are fixed to and contacted with the upper surface 33 and the side surfaces 34 on the third housing 3. FIG. 3E is a view illustrating assembly as viewed from the low voltage sides of the cold-cathode fluorescent tubes 61. Screws 643 are passed through holes (not shown) formed on both ends of the frame 64, and tip ends of the screws are inserted into and fixed to screw holes (not shown) provided on the upper surface 33 shown in FIG. 3F (back side of the upper surface 33 as viewed from FIG. 2). The frame 65 on the high voltage sides of the cold-cathode fluorescent tubes 61 is fixed to the third housing 3 by way of similar screws, but an illustration thereof is omitted. The low voltage terminals of the cold-cathode fluorescent tubes 61 project from the frame 64, and the high voltage terminals project from the frame 65. Connectors 63 are connected to the low voltage terminals, and connectors 62 are connected to the high voltage terminals. In the present embodiment, the connectors 63 connecting in parallel to the plurality of terminals of the cold cathode fluorescent tubes 61 are used in order that a terminal voltage on the low voltage side be made a reference voltage in the third housing 3 (ground voltage in the case where the third housing 3 itself is to be kept at ground potential). FIG. 3H is a perspective view after assembly of the first to third housings, which shows a parallel connection to lengths of cable (lead) 631 passing through central portions of the connectors 63 in the form of frame shown by broken lines. Meanwhile, the connectors 62 having separate leads for every terminal are used for the high voltage terminals of the cold-cathode fluorescent tubes 61. As shown in FIG. 1 and the perspective views as viewed in a IV direction after assembly of the first to third housings, four of the connectors 62 present such an external appearance that they were connected to two of the cold-cathode fluorescent tubes 61. However, internal wiring is not one for conduction between two of the cold-cathode fluorescent tubes 61. This is because of consideration in making lengths of voltage supply paths between the high voltage terminals of the respective cold-cathode fluorescent tubes 61 and voltage transformation elements 81, described later, for supplying of voltage to the respective terminals, uniform. The above-mentioned connection of the connectors 62, 63 leads to completion of a light source unit of the so-called type built-in immediately below a backlight panel, in which the plurality of the cold-cathode fluorescent tubes 61 are arranged opposite to the liquid crystal display panel 4. In addition, reflective sheets (not shown) are applied on surfaces on those sides of the upper surface 33 and the side surfaces 34 of the third housing 3, to which the built-in frames 64, 65 are fixed, whereby light radiated on the surfaces from the respective cold-cathode fluorescent tubes 61 is reflected on the liquid crystal display panel 4 to enhance luminance of the image display area SC.

The timing-converter board 7 shown in FIGS. 1 and 3G and the light source control circuit board 8 (printed circuit board) shown in FIG. 1 are mounted on the upper surface 33 (a side opposite to that side, on which the built-in frames 64, 65 for the cold-cathode fluorescent tubes 61 are fixed) of the third housing 3. These boards are formed by cutting portions of a sheet material, which constitutes the upper surface 33, raising the same above the upper surface 33 (back side as viewed from a user of the liquid crystal display device), and further securely fitting peripheral edges of the same onto hangers 333, which are formed in an angle fashion. The timing-converter board 7 are required to be disposed at corners of the upper surface 33 for the purpose of supplying signals and voltage to the gate drive ICs 41 and the gate drive ICs 42. Therefore, as shown in FIGS. 2, 3F and 6, portions of the side surfaces 34 of the third housing 3 are cut from the upper surface 33 side to form aprons 331 conformed to a height of the upper surface 33. The timing-converter board 7 is fixed to screw holes 334 provided on the aprons by means of screws 74. Meanwhile, the light source control circuit board 8 is also fixed to the upper surface 33 by means of screws 82.

The light source control circuit board 8 in this embodiment is formed with an inverter circuit (dimmer circuit) for controlling lighting of the cold-cathode fluorescent tubes 61, and a power source circuit, which is controlled by the former to supply voltage to the high voltage terminals of the respective cold-cathode fluorescent tubes 61. As the technique for using an inverter circuit to stabilize lighting of the cold-cathode fluorescent tubes 61 has already become widespread, a detailed explanation thereof is omitted herein. Voltage supplied to the high voltage terminals of the respective cold-cathode fluorescent tubes 61 is high, for example, 600 V, 6 mA relative to drive voltages for not only the inverter circuit but also the dimmer circuit. In contrast, power source voltage supplied to light source control circuit board 8 is low like that on the timing converter board 7. Also, it is desired that voltage supply paths for supplying such high voltage to the high voltage terminals of the respective cold-cathode fluorescent tubes 61 be made smaller, and it is requested in giving uniform brightness to the image display area SC in the liquid crystal display panel 4 that voltage supply paths between the cold-cathode fluorescent tubes 61 be made uniform in length especially in a light source unit, which uses the plurality of cold-cathode fluorescent tubes 61. Therefore, the voltage transformation elements 81 for supplying voltage to the high voltage terminals of the respective cold-cathode fluorescent tubes 61 are mounted on the light source control circuit board 8 disposed on the upper surface of the third housing 3, and in the case where the plurality of cold-cathode fluorescent tubes 61 are provided in parallel as in the embodiment, the voltage transformation elements 81 will be disposed along the arrangement of the cold-cathode fluorescent tubes 61.

Such request for the specification of the light source control circuit board 8 is the same not only for a light source unit of the above-mentioned type built-in immediately below a backlight panel, but also for a configuration (light-transmission plate type light source unit), in which discharge tubes such as the cold-cathode fluorescent tubes 61 are arranged in a position offset from a lower portion of the image display area SC in the liquid crystal display panel 4, and a light-transmission plate for transmitting light is disposed in the lower portion of the image display area SC so that light from the discharge tubes is conducted via the light transmission plate to the image display area SC in the liquid crystal display panel 4. The reason for this is that in this configuration high voltage as compared with that for the above-mentioned other drive circuits must be supplied to one ends of the discharge tubes.

Accordingly, configurations of a circuit pattern in the light source control circuit board 8 and of the connectors 62 on the high voltage side, connected to the board are designed taking account of these requests.

In contrast to that wiring on the high voltage side of the cold-cathode fluorescent tubes 61, which is restricted with respect to lengths of the voltage supply paths, wiring on the low voltage side has freedom in configuration. For example, as shown in FIG. 6, the cable 631 may be extended to the light source control circuit board 8 across the upper surface 33 of the third housing 3 from the low voltage terminals of the cold-cathode fluorescent tubes.

In addition, as shown in FIG. 6, the upper surface 33 of the third housing 3 contains a so-called vacant space where the timing-converter board 7 and the light source control circuit board 8 are not disposed. Such vacant space is suitable for mounting of optional circuits by makers, which incorporate liquid crystal display devices into set products such as personal computers, liquid crystal display monitors or televisions. Also, an opening 335 formed centrally of the upper surface 33 serves as a measurement window of a light receiving element for measuring luminance of the cold-cathode fluorescent tubes. In the case where a luminance monitor circuit of the light source unit is mounted in the vacant space on the upper surface 33 of the third housing 3, the liquid crystal display panel can be stably maintained in brightness by measuring emission luminance of the light source unit through the opening 335, and performing feedback of the result to a control circuit on the light source control circuit board 8.

<Assembly of the Liquid Crystal Display Device (fixing of the third housing 3 to the second housing 2)>

As described above, the third housing 3, into which the light source unit is assembled and to which the timing-converter board 7 and the light source control circuit board 8 are fixed, is fixed to the second housing 2. Such fixed configuration is shown in FIG. 3(h), which is a perspective view as viewed from a III direction of FIG. 1, and shown in FIG. 4, which is a perspective view as viewed from a IV direction of FIG. 1, and further shown in FIG. 5D, which is a perspective view as viewed from a V direction of FIG. 1.

As shown at a left end of FIG. 3H, the terrace 32 formed at one end of the third housing 3 and the terrace 22 extended from inside the side surface of the second housing 2 are fixed to each other by screws 322. Locations for such fixing are three as shown in FIGS. 5A–5D. The screws 322 are set in length so as not to extend through the terrace 22 to project much from the upper surface thereof.

Meanwhile, as shown on a right side of FIG. 3H, the terrace 221 extended from inside the side surface of the second housing 2 and the terrace 15 extended from inside the side surface of the first housing 1 define a recess. Fitted into this recess is the terrace 32 formed at the other end of the third housing 3. The third housing 3 is fixed to the second housing 2 by first fitting the terrace 32 formed at the other end of the third housing 3 into the recess, then putting the terrace 32 formed at the one end of the third housing 3 and the terrace 22 of the second housing 2 together to fix them by the screws 322.

Instead of forming the recess by the terrace 15 on the right side of FIG. 3H, screw holes may be provided in the terrace 221 of the second housing and the terrace 32 at the other end of the third housing 3 may be fixed by screws. This configuration makes the first housing simple in design.

Meanwhile, in the case of screwing the terrace 32 to the terraces 22, 221, the following should be taken care of. In the case where an optical sheet is somewhat large in size, tip ends of the screws projected from upper surfaces of the terraces 22, 221 press ends of the optical sheet. Such pressing causes the possibility of imparting an unexpected polarized component to light incident on the liquid crystal display panel 4 from the light source unit. To avoid this, there is recommended a configuration, in which the terrace 32 formed at the other end of the third housing 3 is fitted into the recess. Also, in the embodiment, a position where the terrace 32 at the one end of the third housing 3 is screwed to the terrace 22 of the second housing 2 is set near an inner wall on the side surface of the second housing 2 distant from the image display area SC in the liquid crystal display panel 4. Further, the position of screwing is provided on a side where the gate drive ICs 42 are arranged. The reason for this is that a position, which meets at least one of these conditions, makes a dead space (there is no possibility that the optical sheet is extended to this position) relative to the position of the optical sheet even taking account of errors in design. Meanwhile, in the embodiment, as shown in FIGS. 5A and 5B, the protrusions 24 are provided on the lower portion of the side surface of the second housing 2, and notches 14 formed on the lower portion of the side surface of the first housing 1 are fitted right and left the protrusions. Therefore, the terrace 32 cannot be screwed to the terrace 22 in a position near the side surface of the second housing 2 where the notches 14 are fitted. Hereupon, as shown in a lower portion of FIG. 6, the terrace 22, on an end of which the protrusions 24 are formed, is used for screwing. This is because the notches 14 are not fitted on the underside of the terrace 22. Also, the entire terrace 32 of the third housing 3 is not extended to the inner wall on the side surface of the second housing 2, but a portion used for the above-mentioned screwing is extended as the terrace 321 to the inner wall on the side surface of the second housing 2 and ends thereof are used for screwing as shown in FIGS. 2 and 6.

In addition to the above-mentioned screwing and fitting into the recess, the terrace 32 of the third housing 3 and the terraces 22, 221 of the second housing 2 may be fixed to one another by providing clips (not shown) on, for example, the terrace 22 of the second housing 2 and having them interposing therebetween the aprons 321, which project from the terrace 32 of the third housing 3. The clips may be installed by fixing elastic clip members to the terrace 22 by way of screws, soldering or welding, but in the case where the second housing 2 is formed from elastic metals, resins or the like, it may be partially formed with notches and portions thereof may be raised toward the contact surfaces of the aprons 321. In this case, the aprons 321 are fixed by the use of righting forces of the notch portions of the terrace 22.

The third housing 3 is fixed to the second housing 2 to complete the liquid crystal display device according to the embodiment. FIG. 3I shows an external appearance of a liquid crystal display module MDL as viewed from a III direction of FIG. 1. As compared with the perspective view shown in FIG. 3H, the external appearance becomes neat and clear. These liquid crystal display devices are also called a liquid crystal display module, and are actually incorporated into housings of personal computers, liquid crystal display monitors or televisions to be sold to consumers.

<Setting of the Protrusions 31 on the Upper Surface of the Third Housing 3>

Although not conspicuous in the external appearance shown in FIG. 3I, an upper end of the voltage transformation element 72 mounted on the timing-converter board 7 actually projects in many cases from the underside of the side surface of the first housing 1. Also, when seen in the IV direction in FIG. 1, that is, from a side where the light source control circuit board 8 is mounted, upper ends of the voltage transformation elements 81 mounted on the light source control circuit board 8 project from the first side surface as shown in the perspective view shown in FIG. 4.

When elements fixed to the housings assembled in this manner project, there is caused the possibility that these elements may be broken at the time of mounting of the liquid crystal display devices onto set products such as personal computers, liquid crystal display monitors or televisions. Also, there is caused a similar possibility at the time of shipment of the liquid crystal display devices to makers of the above-mentioned set products.

In the present invention, the protrusions 31 are provided on the upper surface 33 (back side as viewed from a user of the liquid crystal display device) of the third housing 3 in order to protect elements (electronic parts and so on) fixed to the housings, which constitute the liquid crystal display device, from the above-mentioned breakage. The reason for provision of the protrusions 31 on the third housing 3 is as follows.

As described above, the third housing 3 is provided with the light source unit. Meanwhile, the first housing 1 and the second housing 2 grasp the liquid crystal display panel 4 by peripheral edges of the upper and lower surfaces thereof to receive the liquid crystal display panel 4 therebetween as described above. One of the upper and lower surfaces of the liquid crystal display panel 4 must have light from the light source unit being incident upon a liquid crystal layer provided therein, and the other of the upper and lower surfaces must display an image, which is generated by modulation of the light at the liquid crystal layer, to a user of the liquid crystal display device. Because of this, the first housing 1 and the second housing 2 are formed with openings (for example, the opening 11 of the first housing 1 shown in FIG. 3A) along the surface (the main surface of one of the substrates 441, 442 contained in the panel) of the liquid drystal display panel 4. In contrast, it is not necessary to form any opening on a member (an upper portion of the upper surface 33 in FIG. 3F) of the third housing 3, which holds the light source unit. Therefore, mounting of the timing-converter board 7 and the light source control circuit board 8 on the member is desired in stably fixing these boards to the liquid crystal display device. Accordingly, electric circuit elements being protected by the protrusions 31 are fixed to the timing-converter board 7 and the light source control circuit board 8, so that they are naturally disposed on the upper surface 33 of the third housing 3.

Also, since the first housing 1 and the second housing 2 protect a peripheral edge of the liquid crystal display panel 4 as well as the drive ICs, they become large in area along the surfaces of the liquid crystal display panel 4. In contrast, the light source unit suffices to supply light to the image display area SC in the liquid crystal display panel 4, and so its area along the surfaces of the liquid crystal display panel 4 may suffice to correspond to the image display area SC or enlarge the surrounding a little (needs not be enlarged to a side of the drive ICs). As apparent from this, the first housing 1 and the second housing 2 are formed to be larger than the third housing 3 as viewed in a direction (for example, from a viewpoint in FIG. 6) perpendicular to the surface of the liquid crystal display panel 4. In other words, the upper surface 33, the side surfaces 34 and the terrace 32, which constitute the third housing 3, are contained in the respective outer frames of the first housing 1 and the second housing 2.

Therefore, the provision of the protrusions 31 or their equivalent on the third housing 3 rather than on the first housing 1 and the second housing 2 is effective in protecting the above-mentioned electric circuit elements arranged on the upper surface 33 of the third housing 3.

Figure 5D:
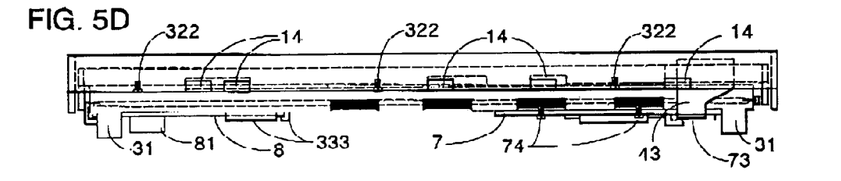
Figure 7A:
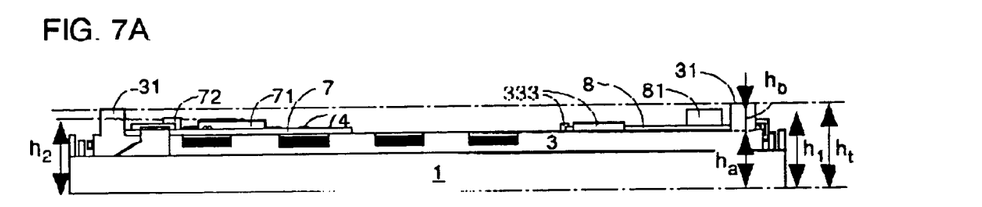
FIG. 7A shows the case where a light source drive circuit is provided on the liquid crystal display device and FIG. 7B shows the case where no light source drive circuit is provided.
Figure 7B:
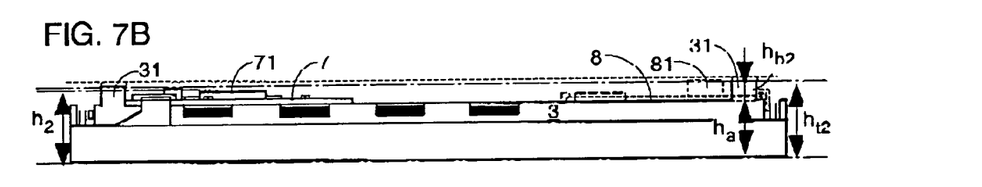

FIGS. 7A and 7B are illustrations of a first constitution according to the invention, FIG. 7A showing the case where the liquid crystal display device shown in FIG. 5D is reversed up and down. In the following explanation, a dimension of the liquid crystal display device along a vertical direction in FIG. 7 is represented as "thickness" or "height", and a dimension of the liquid crystal display device along a direction laterally across FIG. 7 is represented as "width" or "area".

Seeing FIG. 7A on the assumption that the protrusions 31 are not present on the upper surface 33 of the third housing 3, it is found that a thickness $h_1$ of the liquid crystal display device is determined by the voltage transformation elements 81 on the light source control circuit board 8. In the case where the timing-converter board 7 and the light source control circuit board 8 are not provided on the upper surface 33 of the third housing 3, the thickness of the liquid crystal display device is determined by a difference $h_a$ in level between the upper surface 12 of the first housing 1 (see FIG. 3A) and the upper surface 33 of the third housing 3 (see FIG. 3F) (the hangers 333 are neglected). Therefore, the protrusions 31 are provided on the upper surface 33 of the third housing 3, and their height $h_b$ is determined so as to satisfy the relationship $h_b > (hd_1 \ h_a)$. As a result, although the thickness (maximum thickness) of the liquid crystal display device is increased to $h_t$ (however, $h_t > h_1$), a work of mounting the liquid crystal display device on set products is not adversely affected because a position where the protrusions 33 are formed is set back from the peripheral edge of the liquid crystal display device.

In some cases, makers of set products provide light source drive circuits on bodies of such set products as personal computers and the like to make use of a liquid crystal display device in a state, in which the light source control circuit board 8 is not mounted on the liquid crystal display device. In this case, as apparent from FIG. 7A, from which the light source control circuit board 8 and all elements mounted on the board are all removed, the thickness $h_2$ of the liquid crystal display device except for the protrusions 31 is determined by the voltage transformation element 72 on the timing-converter board 7. As apparent from FIG. 7A, the protrusions 31 having a thickness $h_b$ is higher than necessary to protect electric circuit elements on the timing-converter board 7, and rather causes the possibility of interfering with a work, in which the liquid crystal display device is assembled into set products.

In this case, only a member of the third housing 3 is prepared which is different from that shown in FIG. 7A. The third housing 3 shown in FIG. 7B is such that the protrusions 31 have a thickness $h_{b2}$ (however, $h_{b2} > (h_2 - h_a)$ is met). Therefore, the entire liquid crystal display device, on which the light source control circuit board 8 is not mounted, has a thickness $h_{t2}$ (maximum thickness) smaller than $h_1$.

As apparent from the above explanation, there is involved the possibility that depending upon whether a light source control circuit is mounted on a liquid crystal display device mounting thereon a liquid crystal display panel 4 having the same dimension, a housing of the device is substantially varied in size. In the invention, the third housing 3 having the protrusions 31, which are different only in height, is prepared to accommodate variation of the liquid crystal display device, but the following problems arise in the case where protrusions or the like are provided on the side surfaces of the first housing 1 and the second housing 2 to protect the above-mentioned electric circuit elements.

One of the problems is that lines for manufacture of two kinds of liquid crystal display device products, which are different from each other only with respect to the presence of a light source control circuit, must be provided separately from mounting of a liquid crystal display panel 4. Since the first housing 1 and the second housing 2 are both members serving to grasp the liquid crystal display panel 4, assembly on the same line is complex to lower productive efficiency in the case where either of the housings is varied in configuration.

Another one of the problems is that in the case where assembly of the first housing 1 and the second housing 2 of one of the two kinds of liquid crystal display device products is delayed, or failure generates, production itself of that kind of liquid crystal display device products will be delayed.

A configuration of the third housing 3 copes with manufacture of two kinds of liquid crystal display device products as in the invention, and then the process of grasping of the liquid crystal display panel 4 with the first housing 1 and the second housing 2 and intermediate products in the process are made common to the two kinds of liquid crystal display device products.

Further, the invention has the following advantages in conveyance of liquid crystal display device products.

Figure 8:
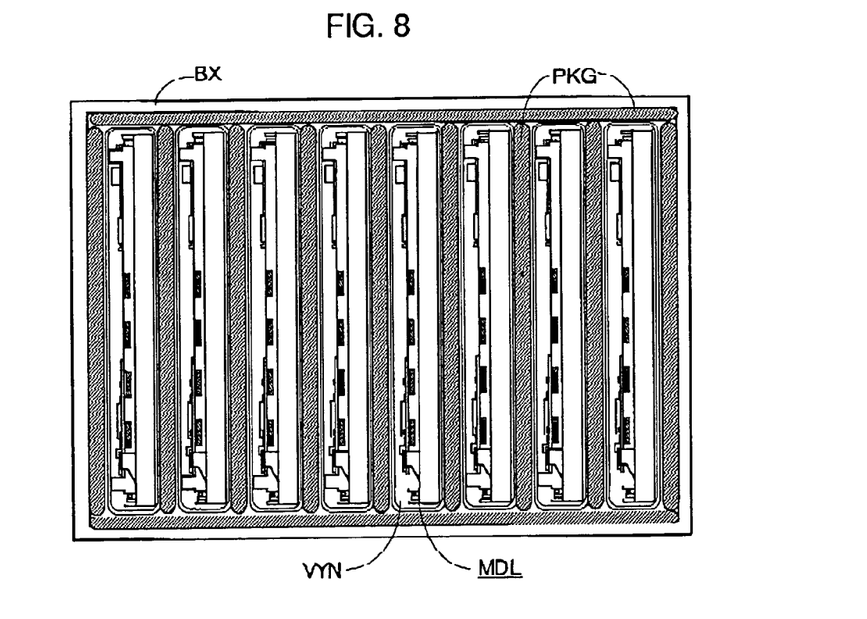
FIG. 8 illustrates a state, in which the liquid crystal display device is packed up at the time of shipping.

These will be explained using an illustration of FIG. 8 showing a condition of packaging at the time of shipment of liquid crystal display devices (also, called a liquid crystal display module).

In FIG. 8, BX denotes a cardboard box for conveyance (for example, decorative box), PKG denotes a packing (cushioning) material, VYN denotes vinyl bags, and MDL denotes liquid crystal display modules (the above-mentioned liquid crystal display device products). The liquid crystal display modules MDL shown employ the invention, in which the protrusions 31 for protection of circuit elements are provided on the third housing 3 (a plurality of the liquid crystal display device shown in FIG. 7A are shown in FIG. 8 while being reduced in size and turned 90 degrees.

A cushioning material such as urethane foam or the like is used as the packing material PKG on inner walls of the cardboard box BX for conveyance. Every one of the liquid crystal display modules MDL is contained in the vinyl bag VYN to be received in the cardboard box for conveyance BX. The packing material PKG is also inserted between the liquid crystal display modules MDL, but cardboard for cardboard boxes is frequently used in place of the packing material.

In such packaging configuration, the protrusions 31 formed on the respective liquid crystal display modules MDL (or the third housing 3) inhibit flexure of the packing material PKG inserted therebetween to prevent the flexed packing material PKG from pressing and breaking electric circuit elements mounted on the respective liquid crystal display modules MDL.

As described above, an area of the third housing 3 extending along the main surfaces of the substrates 441, 442 (also, called a liquid crystal display board) contained in the liquid crystal display panel 4 is smaller than those of the first housing 1 and the second housing 2. Therefore, the provision of the protrusions 31 on the third housing 3 presents an advantage that the protrusions can be located near the electric circuit elements being protected. If the protrusions 31 were provided on the first housing 1 and the second housing 2, location of the protrusions 31 would be distant from the electric circuit elements. The packing material PKG would flex by an amount of the distance between the protrusions 31 and the electric circuit elements. In view of this, it is apparent that possible breakage of the electric circuit elements can be surely prevented by the provision of the protrusions 31 on the third housing 3.

In addition, the voltage transformation elements 72, 81 mounted on the timing-converter board 7 and the light source control circuit board 8 are constituted to include parts such as ferrite core and so on. While depending upon function of voltage transformation, the voltage transformation elements are highest among elements mounted on the timing-converter board 7 and the light source control circuit board 8 in many cases. Also, these voltage transformation elements are said to be susceptible of mechanical shocks as compared with semiconductor ICs (integrated circuit elements), which are molded with a resin (resin material). It has been described that the protrusions 31 had better be set to be higher than a top end of that element (in other words, a highest element relative to the upper surface 33 of the third housing 3), which determines the height of liquid crystal display device except the protrusions. However, directing attention only to breakage of elements at the time of conveyance, the protrusions 31 may be set to be higher (for example, even lower than other semiconductor ICs) than an upper end of a highest one among elements mounted on the upper surface 33 of the third housing 3. Such setting of the protrusions 31 may be altered in its standard in accordance with the specifications of the respective liquid crystal display devices (variation of electric circuit elements as mounted).

In the above description, the protrusions 31 are formed on the upper surface 33 of the third housing 3 but they may be cut partially at their side surfaces 34 to have one ends of cut portions bent to a higher position than the upper surface 33 (in a layout shown in FIGS. 7A and 7B) or may be provided on the aprons 32 (may be suitably changed in position depending upon layouts of the timing-converter board 7 and the light source control circuit board 8).

<Maintenance of the Light Source Unit>

Having been described with respect to assembly of the liquid crystal display device (fixing of the third housing 3 to the second housing 2), with a second constitution of the invention, securing of the third housing 3 and the second, housing 2 is effected separately from securing of the first housing 1 and the second housing 2. This constitution is effective in reducing a burden in maintenance of the light source unit in the liquid crystal display device products (liquid crystal display modules).

Figures 9A, 9B:
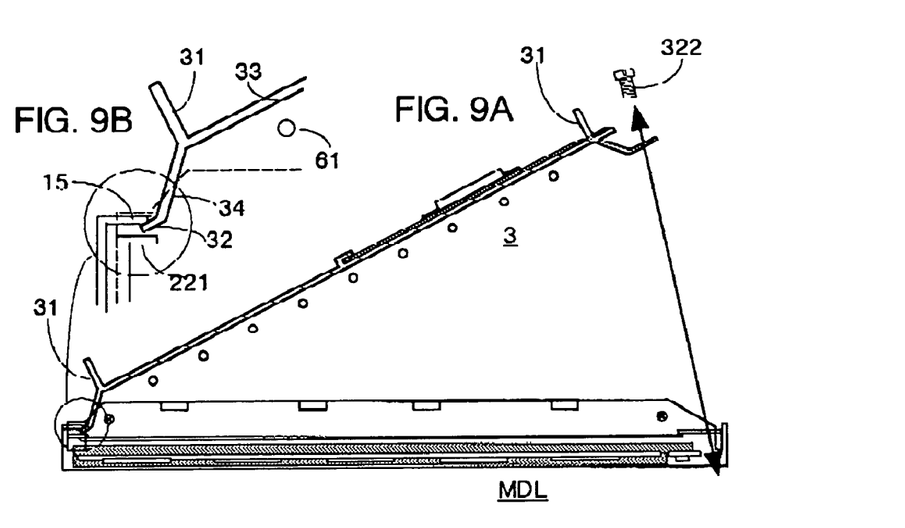
FIG. 9A shows the case where a light source drive circuit is removed from the liquid crystal display device and FIG. 9B shows in enlarged scale a construction shown by a circle of FIG. 9A.

FIGS. 9A and 9B are illustrations of a second constitution according to the invention, FIG. 9A showing the case where a light source unit (the third housing 3, on which the unit is installed) is removed from the liquid crystal display device and FIG. 9B showing in enlarged scale a construction shown by a circle of FIG. 9A. FIG. 9A is equivalent to a construction obtained when FIGS. 3H and 3I are reversed up and down.

As described above, the terrace 32 at the other end (peripheral edge, on which the data drive ICs are not arranged) of the third housing 3 is fitted into the recess defined by the terrace 15 on the first housing 1 and the terrace 221 on the second housing 2. When the screws 322 for securing one end (peripheral edge, on which the data drive ICs are arranged) of the third housing 3 to the terrace 22 on the second housing 2 are disengaged, the one end of the third housing 3 is lifted as shown in FIG. 9A. The terrace 32 at the other end of the third housing 3 is small in a distance between the side surface 34 and an end thereof as compared with the terrace at the one end, and so can be moved in the recess upon lifting of the one end of the third housing 3. The third housing 3 can be disengaged from the second housing 2 (the liquid crystal display module body MDL) in a stage, in which its one end is lifted to some extent.

The third housing 3 having been disengaged from the liquid crystal display module body MDL is placed with the upper surface 33 (surface, on which the timing-converter board 7 and the like are mounted) facing downward, and maintenance and part replacement of the light source unit are carried out. For example, those cold-cathode fluorescent tubes 61 having been degraded in lighting performance are replaced by new ones. The third housing 3 shown in the drawings has the above mentioned protrusions 31 according to the first constitution of the invention, but when such protrusions are not provided, a jig for grasping, for example, the terraces 32 on the both ends of the third housing 3 is prepared so that parts of the timing-converter circuit and the light source control circuit, which are installed on the upper surface 33 of the third housing 3, are prevented from striking against working tables and desks.

As apparent from FIGS. 9A and 9B, other parts, such as the liquid crystal display panel 4 and the optical sheet 5, than parts relating to maintenance of the light source unit can be subjected to the maintenance work while being fixed to the liquid crystal display module body MDL. If the first housing 1 and the second housing 2 were separated in maintenance of the light source unit, it would take enormous time for engagement and disengagement of the liquid crystal display panel 4 and the optical sheet 5, in particular, for positional registering after maintenance. As regards the optical sheet 5, while depending upon its specification, a displayed image is greatly affected in quality by positioning of the optical sheet relative to the liquid crystal display panel 4 and by dust entering between the optical sheet and the liquid crystal display panel during the positioning work.

The second constitution according to the invention reduces a burden on maintenance and examination of set products, such as personal computers, liquid crystal display monitors or televisions, by users or maintenance engineers for the products, even in a state, in which the liquid crystal display module MDL is mounted on the set product.

Figure 10A:
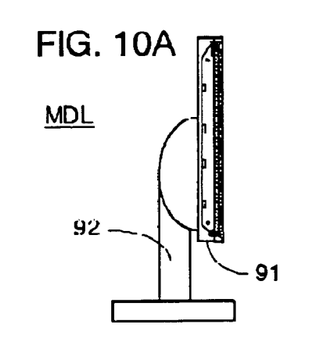
FIG. 10A is a side view.
Figure 10B:
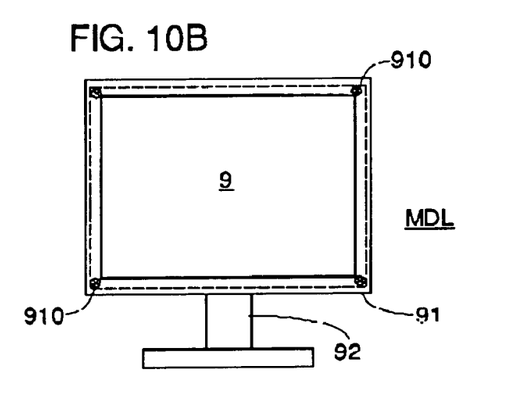
FIG. 10B is a front view (a view seen from the monitor, that is, from a user's side)
Figure 10C:
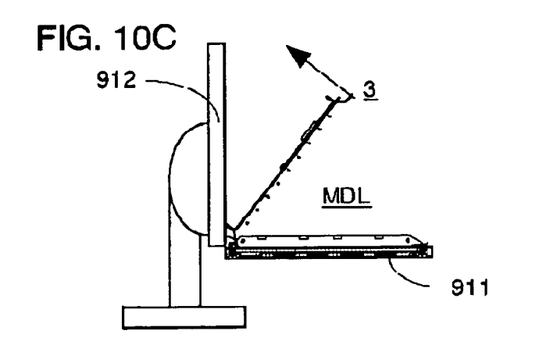
FIG. 10C is a side view showing a state, in which the light source unit is removed in the monitor.

FIGS. 10A–10C show an example of a monitor making use of the liquid crystal display device embodying the second constitution according to the invention. FIG. 10A is a side view, FIG. 10B being a front view (a view seen from the monitor, that is, from a user's side), and FIG. 10C being a side view showing a state, in which the light source unit is removed in the monitor.

A liquid crystal display monitor 9 is composed of an image display unit 91 and a liquid crystal display unit support 92, the former further comprising an image display unit front box 911 and an image display unit rear box 912. Mounted on the liquid crystal display unit support are a power source unit (not shown) for converting electric power (for example, 100 V) supplied from outside into a common voltage (for example, 12 V) in the liquid crystal display monitor, and an interface circuit for reception of signals from an external computer.

The liquid crystal display module MDL (profile of the liquid crystal display module MDL is shown by broken lines in FIG. 10B) is fixed inside the image display unit front box 911 by means of screws 910. The screws 910 extend through either or both of the first housing 1 and the second housing 2 or fix these parts to inner walls of the image display unit front box 911. The screws 910 are used to have a length not reaching the third housing 3 of the liquid crystal display module MDL or contrivance is performed to partially recess the third housing 3 at locations where the screws 910 reach. This is because of preventing the screws 910 from making it impossible to disengage the third housing 3 from the second housing 2.

As shown in FIG. 10C, maintenance of the light source unit of the liquid crystal display module on the liquid crystal display monitor can be performed by opening the image display unit front box 911 from the image display unit rear box 912 fixed to the liquid crystal display unit support 92, taking out the back surface of the liquid crystal display module MDL (upper surface side of the third housing 3), and then in the same manner as described above with reference to FIGS. 9A and 9B.

While the embodiments of the invention have been concretely described above, the invention is not limited to the above-mentioned embodiments and of course can be modified in various manners within the scope not departing from the gist of the invention.

As described above, the invention makes parts and kinds of liquid crystal display devices common to be capable of stably and flexibly coping with commercial products of computer makers and television makers, which have been promoted in various kinds. Also, it is possible to simplify maintenance of a liquid crystal display unit mounted on computers, display monitors therefor or televisions, and to omit positional adjustment of a light source unit and a liquid crystal display panel at the time of maintenance.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A liquid crystal display device, comprising:
    first second and third housings;
    a liquid crystal display panel fixed between said first housing and said second housing;
    a light source fixed to said third housing; the first and second housing being fixed; the second and third housings being detachable, and the first, second and said third housings being overlapped with one another;
    a timing-converter board being fixed to an opposite side surface of said third housing to a side surface, wherein said light source is fixed to said a side surface; and
    protrusions formed on said opposite side surface to determine a maximum thickness of the liquid crystal display device.

2. The liquid crystal display according to claim 1, wherein the protrusions are formed inside a peripheral edge of the liquid crystal display device.

3. The liquid crystal display device according to claim 1, further comprising a light source control circuit arranged on the opposite side surface.

4. A liquid crystal display device according to claim 1, further comprising an optical sheet fixed to said second housing.

5. A liquid crystal display monitor including at least one of a plurality of liquid crystal display devices, each of said plurality of liquid crystal display devices comprising:
    a first housing;
    a second housing;
    a third housing;
    a liquid crystal display panel fixed between said first housing and said second housing;
    a light source fixed to said third housing, wherein said second housing and said third housing are detachable, wherein said first housing, said second housing and said third housing overlap;
    a timing-converter board fixed to an opposite side surface of said third housing to a side surface, wherein said light source is fixed to said a side surface; and
    protrusions formed on said opposite side surface to determine a maximum thickness of the liquid crystal display device.

6. The liquid crystal display device according to claim 1, wherein the timing-converter is not formed on a side surface of the third housing.

\* \* \* \* \*